United States Patent
Barth et al.

(10) Patent No.: US 8,108,609 B2
(45) Date of Patent: *Jan. 31, 2012

(54) STRUCTURE FOR IMPLEMENTING DYNAMIC REFRESH PROTOCOLS FOR DRAM BASED CACHE

(75) Inventors: John E. Barth, Williston, VT (US); Philip G. Emma, Danbury, CT (US); Erik L. Hedberg, Essex Junction, VT (US); Hillery C. Hunter, Somers, NY (US); Peter A. Sandon, Essex Junction, VT (US); Vijayalakshmi Srinivasan, New York, NY (US); Arnold S. Tran, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 737 days.

This patent is subject to a terminal disclaimer.

(21) Appl. No.: 12/126,499

(22) Filed: May 23, 2008

(65) Prior Publication Data

US 2009/0144492 A1   Jun. 4, 2009

Related U.S. Application Data

(63) Continuation-in-part of application No. 11/949,904, filed on Dec. 4, 2007, now Pat. No. 8,024,513.

(51) Int. Cl.
*G06F 12/00* (2006.01)
(52) U.S. Cl. ........ 711/118; 711/104; 711/105; 711/106; 711/153; 711/172; 711/E12.046; 711/E12.084
(58) Field of Classification Search ........................ None
See application file for complete search history.

(56) References Cited

U.S. PATENT DOCUMENTS

| | | | |
|---|---|---|---|
| 4,625,296 A | 11/1986 | Shriver | |
| 5,390,308 A | 2/1995 | Ware et al. | |
| 5,422,846 A | 6/1995 | Chang et al. | |
| 5,430,683 A | 7/1995 | Hardin et al. | |
| 5,895,487 A | 4/1999 | Boyd et al. | |
| 6,009,504 A | 12/1999 | Krick | |
| 6,032,241 A | 2/2000 | Green | |
| 6,148,294 A | 11/2000 | Beyda et al. | |

(Continued)

OTHER PUBLICATIONS

IBM Technical Disclosure Bulletin, (Master Slave Organization of DRAM Cache), vol. 36, Issue 1, pp. 381-383, Jan. 1, 1993.*

(Continued)

*Primary Examiner* — Pierre-Michel Bataille
*Assistant Examiner* — Christopher Birkhimer
(74) *Attorney, Agent, or Firm* — Cantor Colburn LLP; Michael LeStrange

(57) ABSTRACT

A hardware description language (HDL) design structure embodied on a machine-readable data storage medium includes elements that when processed in a computer aided design system generates a machine executable representation of a device for implementing dynamic refresh protocols for DRAM based cache. The HDL design structure further includes a DRAM cache partitioned into a refreshable portion and a non-refreshable portion; and a cache controller configured to assign incoming individual cache lines to one of the refreshable portion and the non-refreshable portion of the cache based on a usage history of the cache lines; wherein cache lines corresponding to data having a usage history below a defined frequency are assigned by the controller to the refreshable portion of the cache, and cache lines corresponding to data having a usage history at or above the defined frequency are assigned to the non-refreshable portion of the cache.

10 Claims, 8 Drawing Sheets

U.S. PATENT DOCUMENTS

| | | | |
|---|---|---|---|
| 6,195,309 B1 | 2/2001 | Ematrudo | |
| 6,295,593 B1 | 9/2001 | Hsu et al. | |
| 6,311,280 B1 | 10/2001 | Vishin | |
| 6,341,079 B1 | 1/2002 | Chadwick | |
| 6,347,357 B1 | 2/2002 | Sartore et al. | |
| 6,389,505 B1 | 5/2002 | Emma et al. | |
| 6,453,399 B2 | 9/2002 | Wada | |
| 6,556,501 B1 | 4/2003 | Naffziger | |
| 6,570,803 B2 * | 5/2003 | Kyung | 365/222 |
| 6,625,056 B1 | 9/2003 | Kihara | |
| 6,678,814 B2 | 1/2004 | Arimilli et al. | |
| 6,697,909 B1 | 2/2004 | Wang et al. | |
| 6,772,277 B2 | 8/2004 | Naffziger | |
| 6,775,176 B2 | 8/2004 | Kihara | |
| 6,819,618 B2 | 11/2004 | Kshiwazaki | |
| 6,826,106 B2 | 11/2004 | Chen | |
| 6,944,713 B2 | 9/2005 | Clark et al. | |
| 6,965,536 B2 | 11/2005 | Shirley | |
| 7,038,940 B2 | 5/2006 | Swanson et al. | |
| 7,039,756 B2 | 5/2006 | Emerson et al. | |
| 7,061,306 B2 | 6/2006 | Nazarian et al. | |
| 2002/0138690 A1 | 9/2002 | Simmonds et al. | |
| 2003/0053361 A1 | 3/2003 | Zhang et al. | |
| 2003/0218930 A1 | 11/2003 | Lehmann et al. | |
| 2004/0162961 A1 | 8/2004 | Lyon | |
| 2004/0268031 A1 * | 12/2004 | Lawrence | 711/106 |
| 2005/0002253 A1 | 1/2005 | Shi et al. | |
| 2005/0102475 A1 | 5/2005 | Reohr et al. | |
| 2005/0108460 A1 | 5/2005 | David | |
| 2005/0216667 A1 | 9/2005 | Cabot et al. | |
| 2006/0036811 A1 | 2/2006 | Diefferderfer et al. | |
| 2006/0041720 A1 | 2/2006 | Hu et al. | |
| 2006/0107090 A1 | 5/2006 | Emma et al. | |
| 2006/0133173 A1 | 6/2006 | Jain et al. | |
| 2006/0190676 A1 | 8/2006 | Butler et al. | |
| 2007/0136523 A1 | 6/2007 | Bonella et al. | |

OTHER PUBLICATIONS

Jim Handy, (The Cache memory Book: The Authoritative Reference on Cache Design), Second Edition, Academic Press, 1998, pp. 34-35.*

David D Lee et al., (Using Cache Mechanisms to Exploit Nonrefreshing DRAM's for On-Chip Memories), IEEE Journal of Solid-State Circuits, vol. 26, No. 4, Apr. 1991.*

David D. Lee et al., "Using Cache Mechanisms to Exploit Nonrefreshing DRAM's for On-Chip Memories," IEEE Journal of Colid-State Circuits, No. 4, Apr. 1991.

Jim Handy, "The Cache Memory Book: The Authoritative Reference on Cache Design," Second Edition, Academic Press, pp. 34-35, 1998.

IBM Technical Disclosure Bulletin, "Master Slave Organization of DRAM Cache," vol. 36, Issue 1, pp. 381-383, Jan. 1993.

U.S. Appl. No. 11/949,904, Non-Final Office Action, filed Dec. 4, 2007, Date Mailed: Jan. 4, 2011.

SearchStorage.com [online]; [retrieved on Mar. 23, 2011]; retrieved from the Internet http://searchstorage.techtarget.com/sDefinition/0,,sid5_gci211728,00.html Cache, pp. 1-2, Aug. 2005.

U.S. Appl. No. 11/949,859; Notice of Allowance; filed Dec. 4, 2007; Date Mailed: Sep. 22, 2010.

WayBackMachine, [online]; [retrieved on Mar. 23, 2011]; retrieved from the Internet http://replay.waybackmachine.org/20060206172608/http://www.downstreamtech .com/Support_CAM/Advisories/CAD_Netlist_Verification.pdf Down Stream Technologies; (CAD Netlist Verification), Version 7.0, pp. 1-4.

WayBackMachine, [online]; [retrieved on Mar. 23, 2011]; retrieved from the Internet http://replay.waybackmachine.org/20010411033304/http://www.webopedia.com/TERM/c/cache.html Webopedia; Cache, pp. 1-3, Sep. 1996.

Junyi Xie et al., "The Case for Building High Performance Intermediate-Level Memory Systems," Duke University; May 2002.

U.S. Appl. No. 12/116,234; Non-Final Office Action; filed May 7, 2008; Date Mailed: Mar. 22, 2011.

U.S. Appl. No. 11/949,935; Notice of Allowance; filed Dec. 4, 2007; Date Mailed: Feb. 8, 2011.

U.S. Appl. No. 11/949,904; Notice of Allowance; filed Dec. 4, 2007; Date Mailed: May 17, 2011.

* cited by examiner

STRUCTURE FOR IMPLEMENTING DYNAMIC REFRESH PROTOCOLS FOR DRAM BASED CACHE

CROSS-REFERENCE TO RELATED APPLICATIONS

This non-provisional U.S. patent application is a continuation in part of pending U.S. patent application Ser. No. 11/949,904, which was filed Dec. 4, 2007, and is assigned to the present assignee

BACKGROUND

The present invention relates generally to integrated circuit memory devices and, more particularly, to a design structure for implementing dynamic refresh protocols for DRAM based cache.

Memory devices are used in a wide variety of applications, including computer systems. Computer systems and other electronic devices containing a microprocessor or similar device typically include system memory, which is generally implemented using dynamic random access memory (DRAM). A DRAM memory cell generally includes, as basic components, an access transistor (switch) and a capacitor for storing a binary data bit in the form of an electrical charge. Typically, a first voltage is stored on the capacitor to represent a logic HIGH or binary "1" value (e.g., $V_{DD}$), while a second voltage on the storage capacitor represents a logic LOW or binary "0" value (e.g., ground). A principal advantage of DRAM is that it uses relatively few components to store each bit of data, and is thus a relatively inexpensive means for providing system memory having a relatively high capacity.

As a result of the package/pin limitations associated with discrete, self-contained devices such as DRAMs, memory circuit designers have used certain multiplexing techniques in order to access the large number of internal memory array addresses through the narrow, pin-bound interfaces. Because these discrete DRAMs have been in use for some time, a standard interface has understandably emerged over the years for reading and writing to these arrays. More recently, embedded DRAM (eDRAM) macros have been offered, particularly in the area of Application Specific Integrated Circuit (ASIC) technologies. For example, markets in portable and multimedia applications such as cellular phones and personal digital assistants utilize the increased density of embedded memory for higher function and lower power consumption. Unlike their discrete counterparts, the eDRAM devices do not have the limited I/O pin interfaces with associated memory management circuitry. In fact, the typical I/O counts for eDRAM devices can number in the hundreds.

One disadvantage of DRAM (including eDRAM), however, is that the DRAM memory cells must be periodically refreshed as the charge on the capacitor eventually leaks away and therefore provisions must be made to "refresh" the capacitor charge. Otherwise, the data bit stored by the memory cell is lost. While an array of memory cells is being refreshed, it cannot be accessed for a read or a write memory access. The need to refresh DRAM memory cells does not present a significant problem in most applications; however, it can prevent the use of DRAM in applications where immediate access to memory cells is required or highly desirable.

Thus, in certain instances, the refresh process involves accessing memory locations corresponding to the same location from which data is needed for system operation. This contention with refresh increases the average latency of the operational accesses. In addition to decreasing memory availability, refresh requirements of eDRAM can also negatively impact power performance and add complexity to system implementation. On the other hand, alternative refresh solutions (such as conventional selective/partial refreshing, for example) save power, but at the cost of degraded performance from the loss of data. Accordingly, it is desirable to be able to provide improved approaches to refresh protocol management for simultaneously improving memory availability, system performance and power consumption.

SUMMARY

The foregoing discussed drawbacks and deficiencies of the prior art are overcome or alleviated by a hardware description language (HDL) design structure embodied on a machine-readable data storage medium, the HDL design structure comprising elements that when processed in a computer aided design system generates a machine executable representation of a device for implementing dynamic refresh protocols for DRAM based cache. The HDL design structure further includes a DRAM cache partitioned into a refreshable portion and a non-refreshable portion; and a cache controller configured to assign incoming individual cache lines to one of the refreshable portion and the non-refreshable portion of the cache based on a usage history of the cache lines; wherein cache lines corresponding to data having a usage history below a defined frequency are assigned by the controller to the refreshable portion of the cache, and cache lines corresponding to data having a usage history at or above the defined frequency are assigned to the non-refreshable portion of the cache.

BRIEF DESCRIPTION OF THE DRAWINGS

Referring to the exemplary drawings wherein like elements are numbered alike in the several Figures.

DETAILED DESCRIPTION

Disclosed herein is a method and system for implementing dynamic refresh protocols for DRAM based cache by partitioning regions of the cache into "refreshable" and "non-refreshable" portions. In addition to the partitioning, the embodiments disclosed herein also track the usage history of individual cache lines in order to determine appropriate placement of incoming cache lines into either the refreshable or non-refreshable portion of the DRAM cache. In an exemplary software implementation thereof, a "hint" bit may be provided in a load instruction such that when the instruction is decoded, the decoder may determine the preferred location for the load instruction's data (e.g., refreshable cache partition or non-refreshable cache partition). Alternatively, an exemplary hardware implementation can track and store the usage history of the cache line through various counting and status bits in the cache tag array and in the next level of memory hierarchy, as described more fully hereinafter. When the hardware history saved in the next-level of memory hierarchy is sent along with an incoming line, the cache controller decodes the bit to determine the preferred location for that line.

Figure 1:
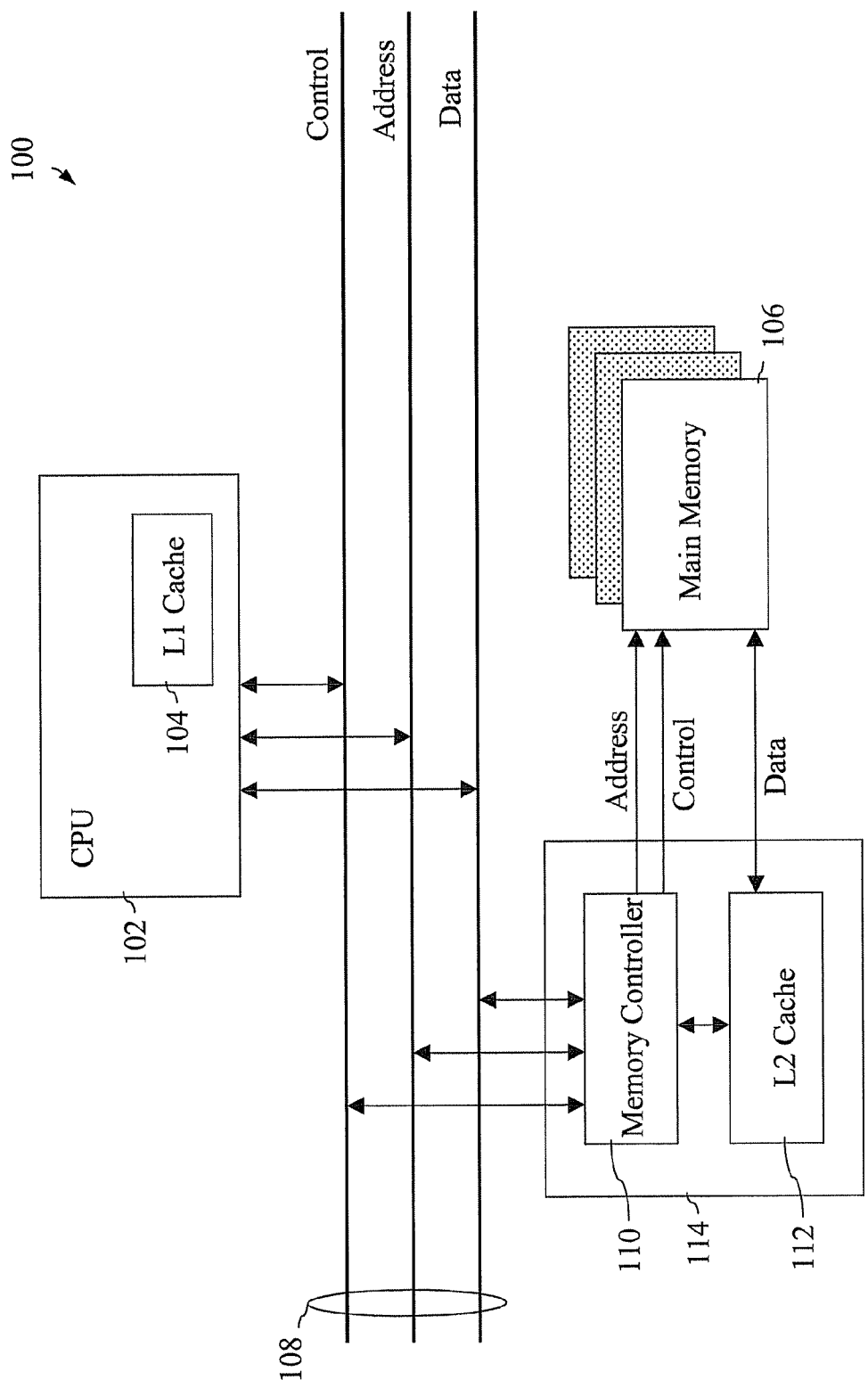
FIG. 1 is a schematic block diagram illustrating an exemplary memory organization of a computer system suitable for use in accordance with an embodiment of the present invention.

Referring initially to FIG. 1, there is shown a block diagram illustrating an exemplary memory organization of a computer system 100 suitable for use in accordance with an embodiment of the present invention. The computer system 100 includes a central processing unit (CPU) 102 with an on-chip cache memory (L1 Cache) 104, a main memory 106, CPU bus 108, a memory controller 110 for controlling data traffic on the CPU bus 108, and a second level cache memory (L2 Cache) 112.

The first level cache memory 104 is integrated on the same chip with the CPU 102 and, as a result, is faster than main memory 106 with a higher bandwidth and shorter wire length, therefore avoiding any delay associated with transmitting and/or receiving signals to and/or from an external chip. The second level cache memory 112 is located on a different chip 114 than the CPU 102, and has a larger capacity than the first level cache memory 104 but smaller than the main memory 106.

The cache memories 104, 112 serve as buffers between the CPU 102 and the main memory 106. In each of the cache memories 104, 112, data words are stored in a cache memory and are grouped into small pages called "cache blocks" or "cache lines". The contents of the cache memory are a copy of a set of main memory blocks. Each cache line is marked with a "TAG address" that associates the cache line with a corresponding part of the main memory. TAG addresses (which may be non-continuous) assigned to the corresponding cache lines are stored in a special memory, called a TAG memory or directory.

In the first level cache memory 104, when an address is requested by the CPU 102 to access certain data, the requested address is compared to TAG addresses stored in a TAG memory of the first level cache memory 104. If the requested address is found among the TAG addresses in the TAG memory, it is determined that data corresponding to the requested address is present in the cache memory 104, which is referred to as a "hit". Upon finding the data of the requested address in the cache memory 104, the data is transferred to the CPU 102. The TAG memory may also contain an offset address to locate the data in the cache memory 104. Locating data in a cache memory is well known in the art, thus a detailed description thereof is omitted herein.

On the other hand, if the requested address is not found in the TAG memory of the cache memory 104, it is determined that the data corresponding to the requested address is not present in the cache memory 104, which is referred to as a "miss". When a miss occurs in the first level cache memory 104, the requested address is sent to a lower level memory, for example, the second level cache memory 112. If a miss occurs in the second level cache memory 112 (i.e., the data is not present in the second level cache memory), the requested address is sent to a third level cache memory (if available) or a main memory.

As the present invention embodiments described herein may be applied to any DRAM (and more specifically eDRAM) cache memory used in a hierarchical memory system to support main memory, the implementation of dynamic refresh protocols for DRAM based cache could be applied to the first level (L1) cache memory 104, as well as to the second level (L2) cache memory 112.

Figure 2:
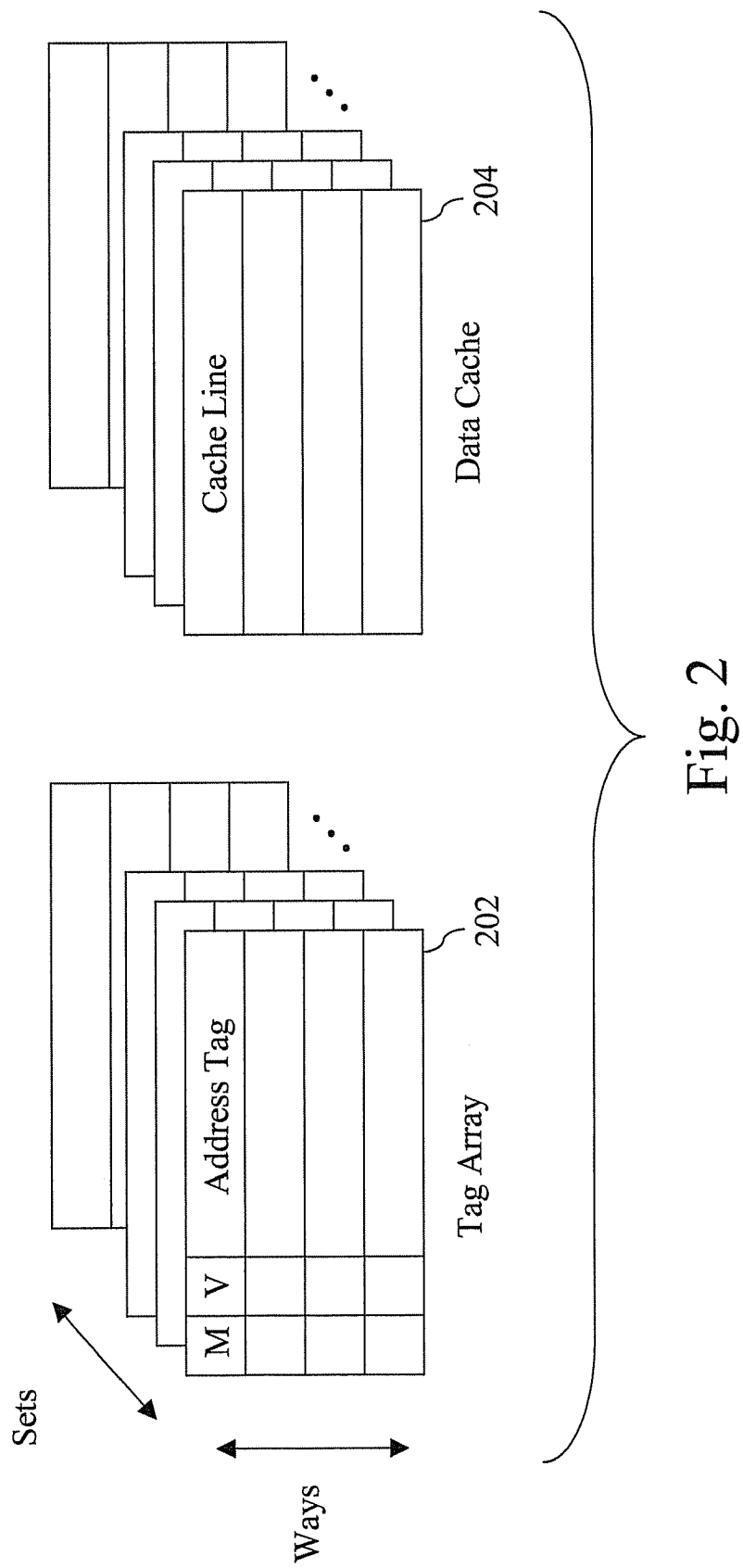
FIG. 2 is a schematic diagram of a portion of a SRAM based tag array associated with a DRAM data cache suitable for use in accordance with an embodiment of the invention.

Referring to FIG. 2, there is shown a schematic diagram of a portion of a SRAM based tag array 202 associated with a DRAM data cache 204 (e.g., representing the L1 cache 104 or L2 cache 112 of FIG. 1). Whereas an existing cache memory may integrate a valid bit (V) and a modify bit (M) as standard status bits for a tag array, the present embodiments may further incorporate a pair of count bits configured as "reuse" counters for the cache, as well as a single bit "hot/cold" indicator in the next level of hierarchy, as also described in further detail herein.

Dynamically Controlled Refresh Protocol Using Software Hints

Figure 3:
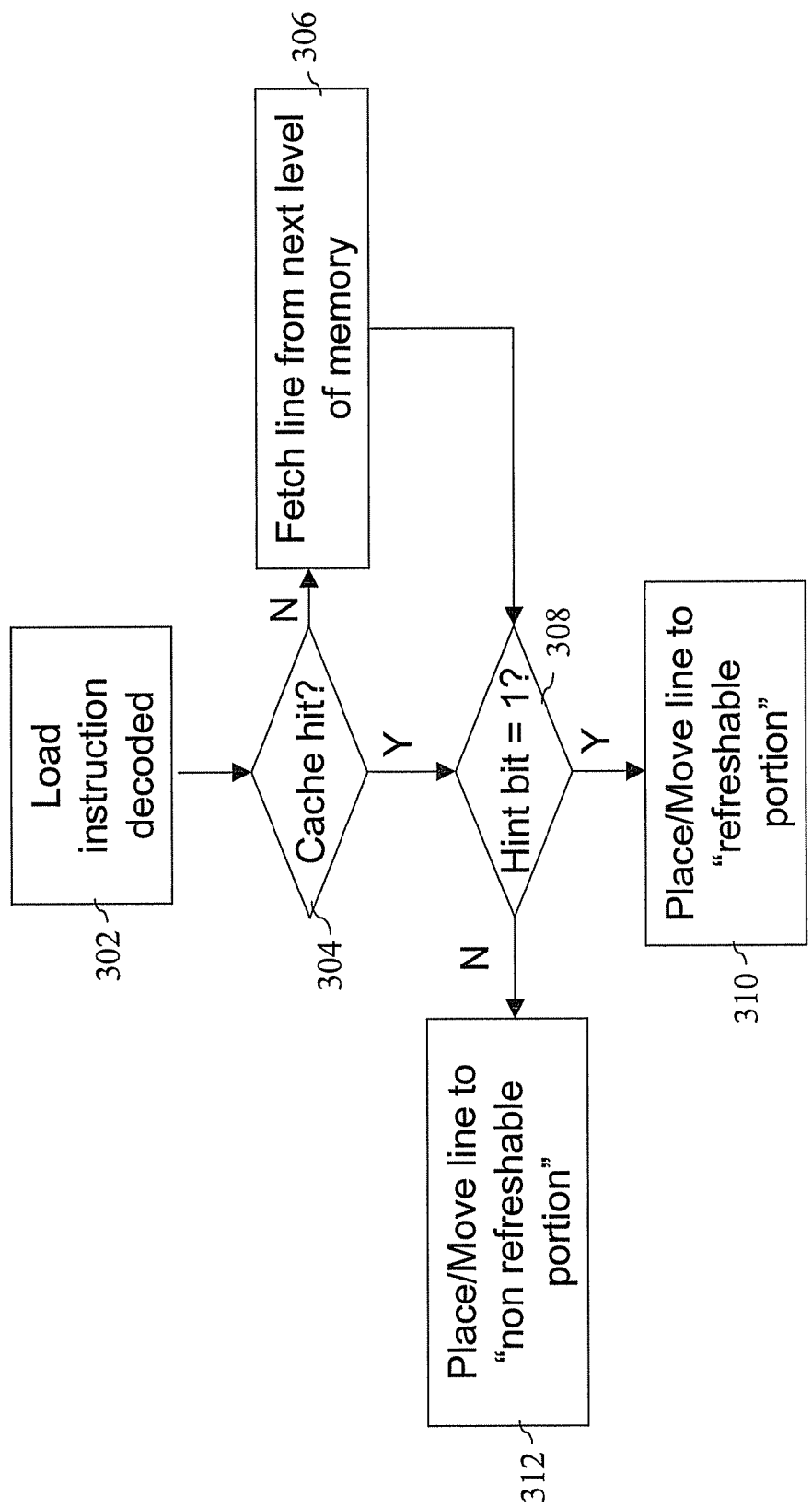
FIG. 3 is a flow diagram illustrating an exemplary software implementation of a method and system for implementing dynamic refresh protocols for DRAM based cache, in accordance with an embodiment of the invention.

Referring now to FIG. 3, there is shown a flow diagram illustrating an exemplary software implementation of a method and system for implementing dynamic refresh protocols for DRAM based cache, in accordance with an embodiment of the invention. Upon decoding of a load instruction, as indicated in block 302, it is initially determined whether the requested data is present in the cache as indicated in decision block 304. If so, the line is fetched from the next level of memory in the hierarchy (i.e., a cache miss) as indicated in block 306. In the case of a cache hit, it is next determined at decision block 408 whether a hint bit associated with the instruction is set to a logical value (e.g., "1"), corresponding to whether the data needs refreshing. If so, the data is placed/moved to a designated refreshable portion of the cache in block 310; otherwise, the data is placed/moved to a designated non-refreshable portion of the cache in block 312.

As used herein, a refreshable portion of the cache refers to locations that are subjected to a refresh cycle apart from refreshing due to a read/write operation, while data in a non-refreshable portion of the cache is not refreshed unless the line is accessed due to a read/write operation. Thus, the data in the non-refreshable portion of the cache is left to expire if not continually accessed. Further, with respect to partitioning a cache into refreshable and non-refreshable portions, this may represent a physical division or a simply designated partitioning. The relative percentage breakdown of refreshable versus non-refreshable portions of the cache may depend on desired tradeoff characteristics wherein, for example, the non-refreshable portion could represent up to about half the total cache size.

With respect to determining whether particular loaded data needs refreshing to begin with (i.e., assigning the value of the hint bit), the compiler may determine the lifetime of data loaded from the memory into the DRAM-based cache. Such an analysis can be done offline for an application, and is independent of the hardware. In one embodiment, the compiler can track an application's phase changes, and consequently the working set changes. If a particular segment of memory was actively used in one part of the program, and if the program then moves to another phase where the data in that segment is rarely used, then the compiler can insert the hint bit in the load instruction to indicate that the data being loaded is now a candidate for refresh.

Thus, when the load instruction is decoded, if the hint bit in the load instruction is set to 1, the data accessed by this load, if already present in cache, is marked "do not refresh" for future use. If the corresponding data is not present in the cache, the data can be placed in that non-refreshable region/portion of the cache where a refresh signal is not sent. Managing the refresh protocol by using the hint bit therefore allows the same data to be dynamically marked as refreshable during one phase of an application, and subsequently as not refreshable in another phase of the same application.

Dynamically Controlled Refresh Protocol Using Hardware Assists

Figure 4:
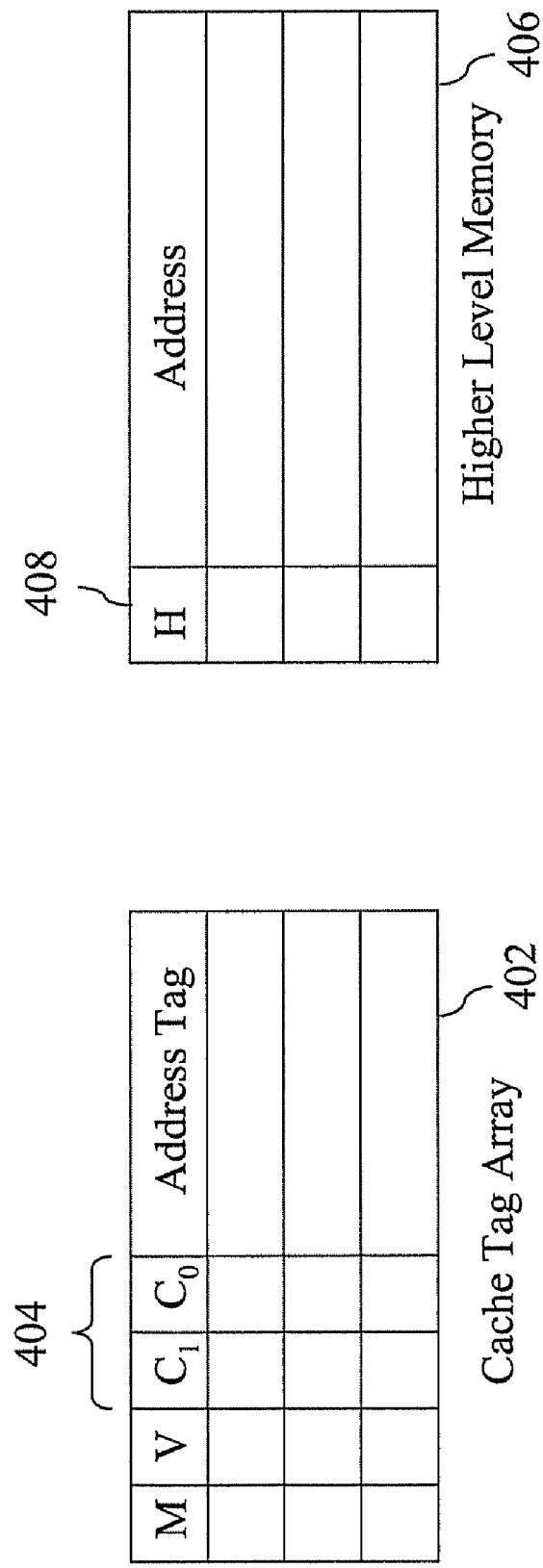
FIG. 4 is a schematic diagram of a modified eDRAM cache tag array to include a two-bit saturating re-use counter for each cache line that tracks the usage of the data in that line, and a single hot/cold indicator bit for tracking the line usage history in the next level of memory hierarchy, in accordance with an embodiment of the invention.

In lieu of encoded load instructions, cache hardware may be configured to include predictors to determine if the data is present in the cache already, or the new incoming data into the cache is to be marked "do not refresh" for the future. In one embodiment, all modified lines in the cache are in a predetermined set/way, which is always refreshed. In another embodiment, a cache directory entry (if the data is not modified) is invalidated if a refresh has failed. Such invalid lines can be used to accommodate new incoming lines due to demand fetch, or prefetch. In another embodiment, the hardware tracks cache line usage during its residency in the cache using a 2-bit access counter per line. For example, as shown in FIG. 4, an eDRAM cache tag array 402 may be modified to include a two-bit ($C_0$, $C_1$) saturating re-use counter 404 for each cache line that tracks the usage of the data in that line. Based on the value of the counter 404 at the time of line replacement, the line usage history is stored in the next level of memory hierarchy 406 (e.g., lower level cache, main memory) through a single "hot/cold" indicator bit 408.

Figure 5A:
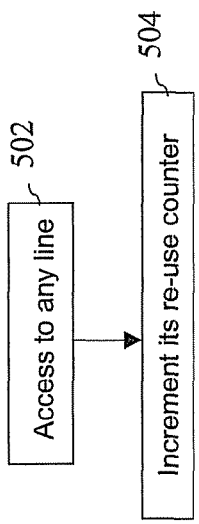
FIGS. 5(a) through 5(d) are flow diagrams illustrating an exemplary operation of the hardware implementation of FIG. 4, in accordance with a further embodiment of the invention.

Referring generally to FIGS. 5(a) through 5(d), there is shown a series of flow diagrams illustrating an exemplary operation of the hardware implementation of FIG. 4, in accordance with a further embodiment of the invention. As depicted in FIG. 5(a), each access of a given cache line (block 502) increments the value of the associated counter 404 by 1 (block 504). For a saturating two-bit counter 404, subsequent accesses of the counter beyond a third access in a given refresh cycle will not cause the counter to reset to '00', but will instead remain saturated at '11' until a specific reset operation of the counter is performed.

Figure 5B:
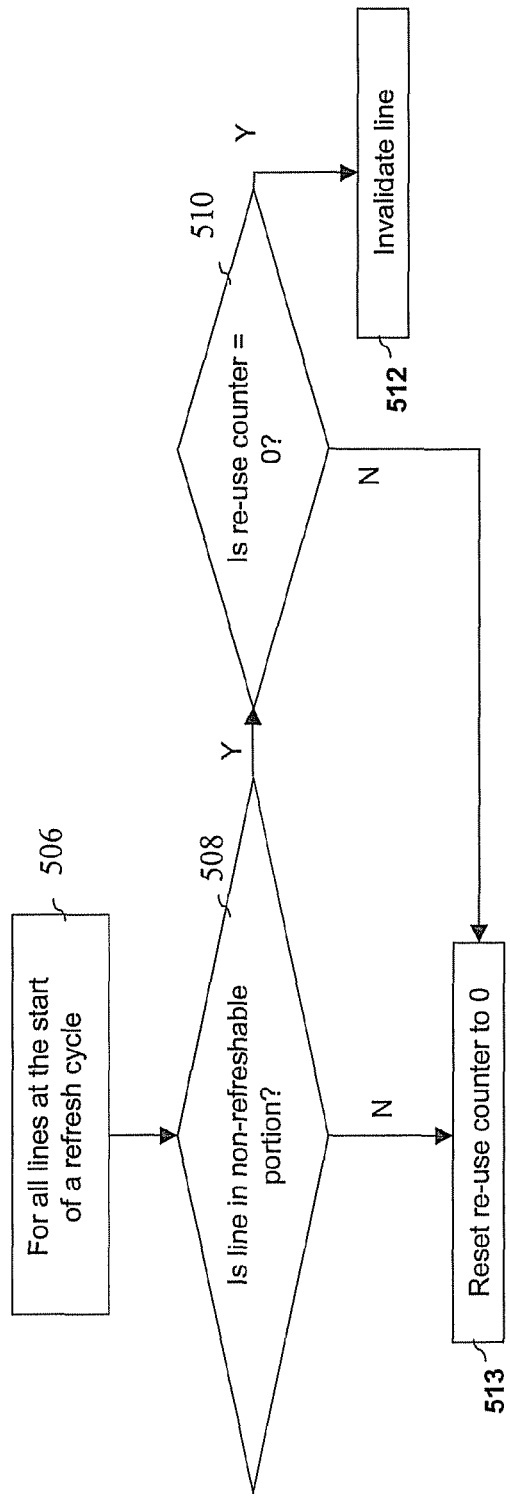

As further shown in FIG. 5(b), each cache line is subjected to the following process at the beginning of a refresh cycle, as shown in block 506. If the cache line happens to be in a non-refreshable portion of the cache as reflected in decision block 508, and it is further determined in decision block 510 that its re-use counter is 0, then the data therein is not valid (because it has not been accessed since the last refresh cycle and therefore was not refreshed by an access operation). Accordingly, the cache line is invalidated in block 512. On the other hand, if the cache line is in a refreshable portion of the cache as reflected in decision block 508, or if the cache line is in a non-refreshable portion but has been used (accessed) at least once (meaning the reuse counter ≠0), then the re-use counter is reset to 0 in block 513.

Figure 5C:
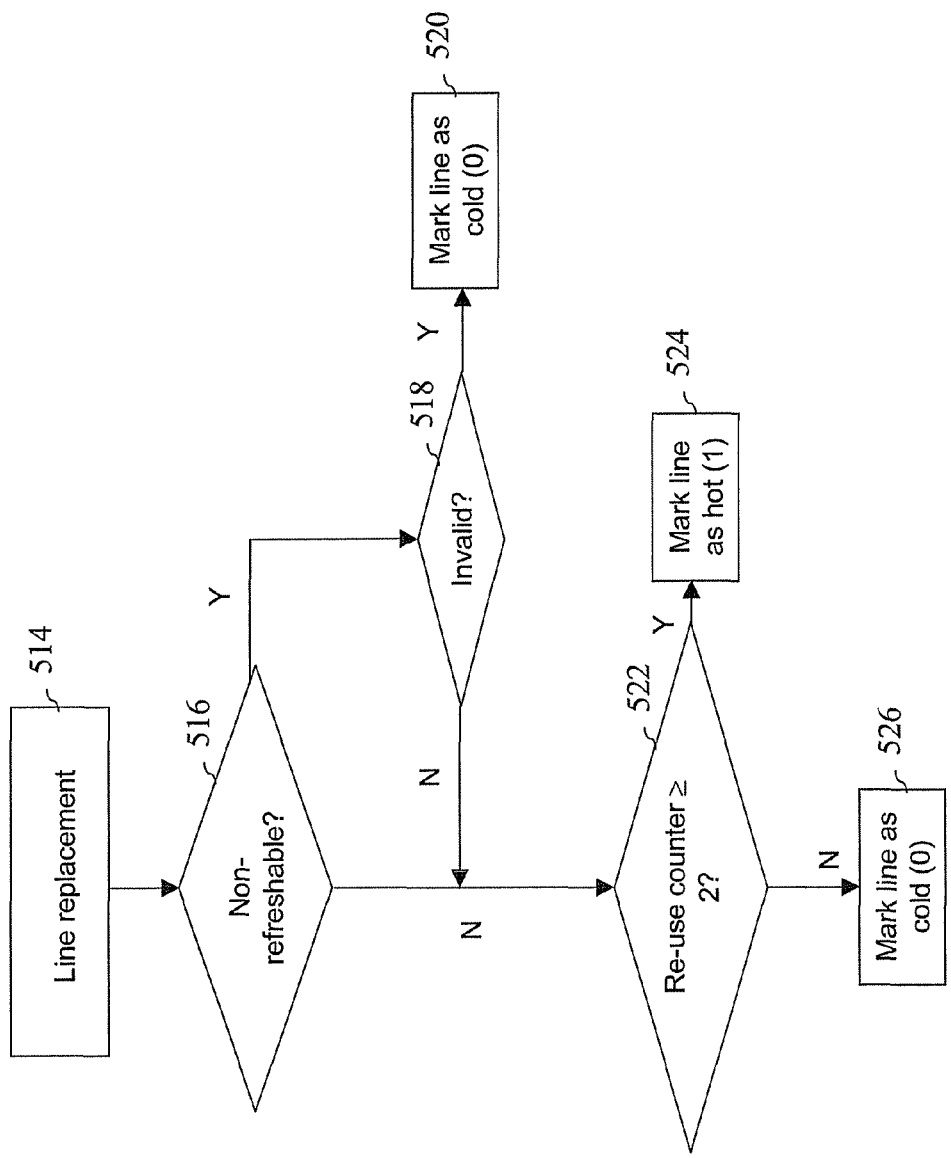

FIG. 5(c) illustrates the results of line replacement in the cache. If a cache line is to be evicted (replaced from the cache) as shown in block 514, it is first determined whether the line is in a non-refreshable portion of the cache as reflected in decision block 516. If so, then the tag data is checked to determine whether the data is invalid at decision block 518, wherein the cache line is marked as cold by setting the hot/cold indicator bit to a first value (e.g., 0) in block 520. On the other hand, if the cache line in a non-refreshable portion is still valid, or if the cache line is in a refreshable portion of the cache, it is then determined in decision block 522 whether the value of the reuse counter for that line is at least 2 or higher (i.e., the line has experienced at least 2 usages since the last refresh cycle). For lines having at least 2 usages since the most recent refresh cycle, the cache line is marked as hot by setting the hot/cold indicator bit to a second value (e.g., 1) in block 524. However, if the cache line to be evicted was not used at all, or used only once since its last refresh, the line is marked as cold in block 526. Again, the hot/cold indicator bit is associated with the next level of memory hierarchy, thereby tracking and maintaining a usage history of that line.

Figure 5D:
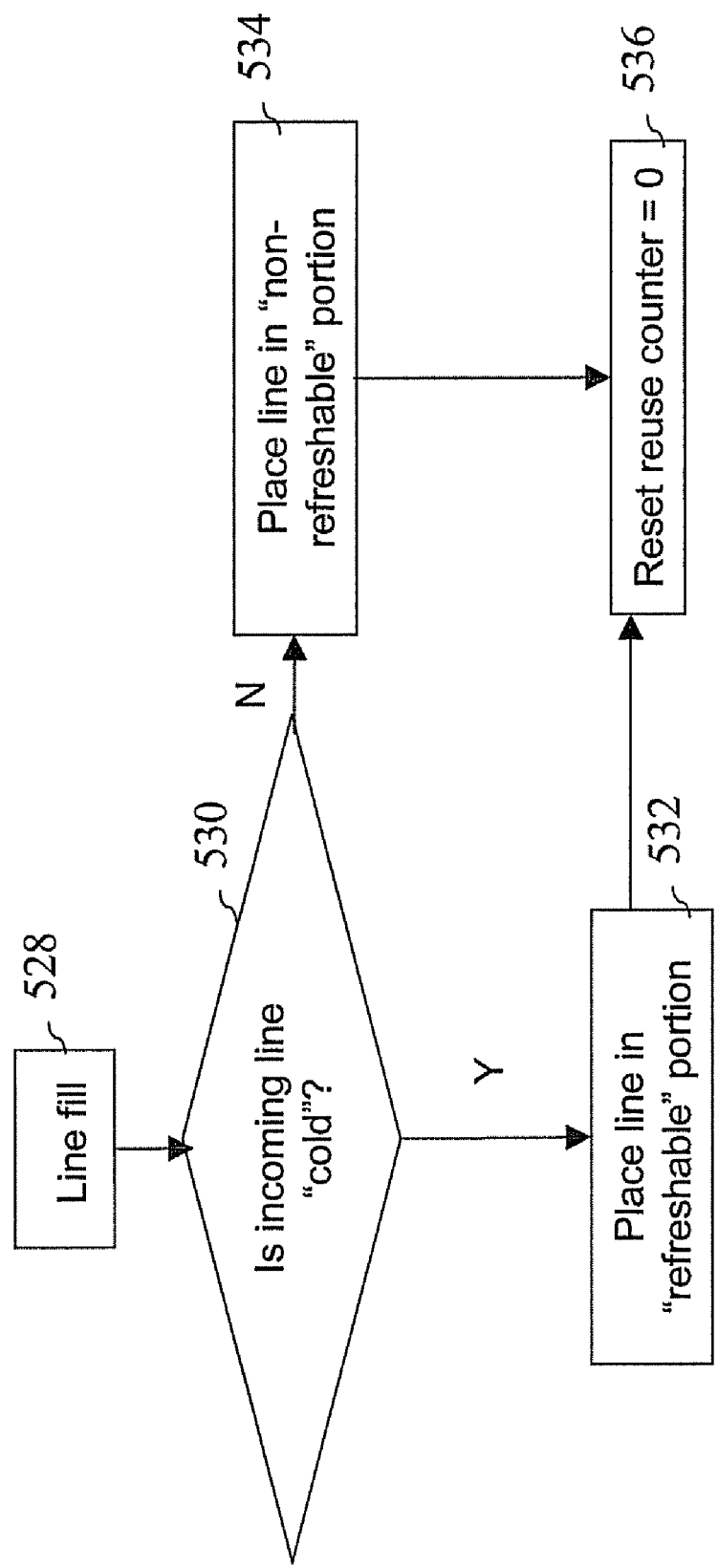

In the future, when the line is subsequently brought into the cache for a demand fetch, or prefetch, a cold line is placed in the refreshable portion of the cache, and a hot line is placed in the non-refreshable partition of the cache, as depicted in blocks 528, 530, 532 and 534 of FIG. 5(d). Initially, all lines are marked as cold in the next level hierarchy and are thus placed into the refreshable partition when first requested. However, as described above, an evicted cache line (depending on its immediate usage history while in the cache) can be designated as "hot" back in the lower level memory just prior to eviction from the cache, such that it gets placed back in a non-refreshable portion of the cache upon a subsequent access request.

Conversely, a hot line present in the non-refreshable partition is not refreshed periodically and therefore remains valid only if accessed. Thus, when this line is replaced, if it is invalid (i.e., the data has expired), it is now marked as "cold" back in the next level and therefore designated to be placed into the refreshable partition upon its next tour in the cache. In still another embodiment, a refreshless DRAM cache such as that disclosed in Ser. No. 11/950,015 (assigned to the assignee of the present application, and the contents of which are incorporated herein in their entirety) can be used to determine the data usage pattern in the non-refreshable portion to determine if the line needs to be marked as hot or cold during replacement.

Figure 6:
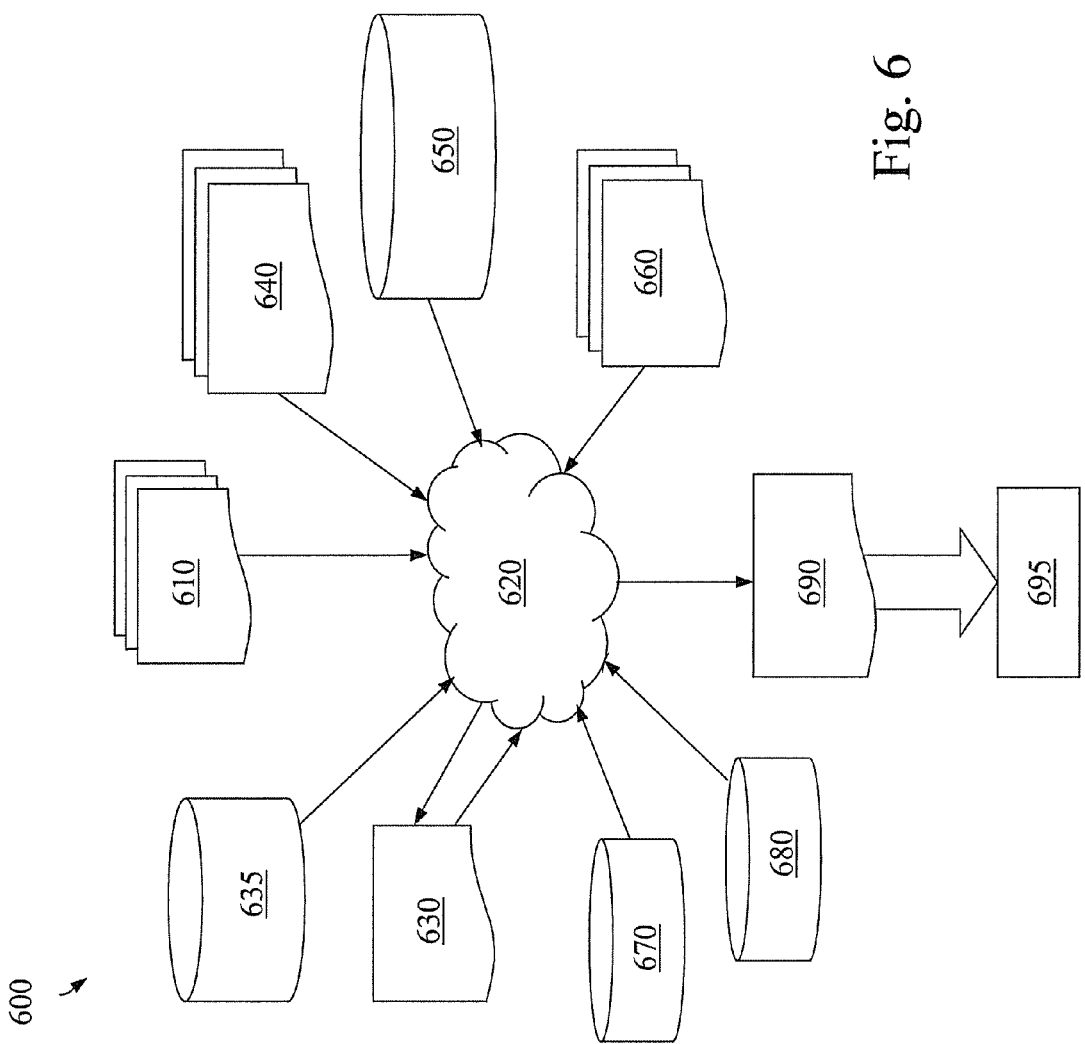
FIG. 6 is a flow diagram of a design process used in semiconductor design, manufacture, and/or test.

FIG. 6 shows a block diagram of an exemplary design flow 600 used for example, in semiconductor IC logic design, simulation, test, layout, and manufacture. Design flow 600 includes processes and mechanisms for processing design structures or devices to generate logically or otherwise functionally equivalent representations of the design structures and/or devices described above and shown in FIGS. 1, 2 and 4. The design structures processed and/or generated by design flow 600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Design flow 600 may vary depending on the type of representation being designed. For example, a design flow 600 for building an application specific IC (ASIC) may differ from a design flow 600 for designing a standard component or from a design flow 600 for instantiating the design into a programmable array, for example a programmable gate array (PGA) or a field programmable gate array (FPGA) offered by Altera® Inc. or Xilinx® Inc.

FIG. 6 illustrates multiple such design structures including an input design structure 610 that is preferably processed by a design process 620. Design structure 610 may be a logical simulation design structure generated and processed by design process 620 to produce a logically equivalent functional representation of a hardware device. Design structure 610 may also or alternatively comprise data and/or program instructions that when processed by design process 620, generate a functional representation of the physical structure of a hardware device. Whether representing functional and/or structural design features, design structure 610 may be generated using electronic computer-aided design (ECAD) such as implemented by a core developer/designer. When encoded on a machine-readable data transmission, gate array, or storage medium, design structure 610 may be accessed and processed by one or more hardware and/or software modules within design process 620 to simulate or otherwise functionally represent an electronic component, circuit, electronic or logic module, apparatus, device, or system such as those shown in FIGS. 1, 2 and 4. As such, design structure 610 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 620 preferably employs and incorporates hardware and/or software modules for synthesizing, translating, or otherwise processing a design/simulation functional equivalent of the components, circuits, devices, or logic structures shown in FIGS. 1, 2 and 4 to generate a netlist 630 which may contain design structures such as design structure 610. Netlist 630 may comprise, for example, compiled or otherwise processed data structures representing a list of wires, discrete components, logic gates, control circuits, I/O devices, models, etc. that describes the connections to other elements and circuits in an integrated circuit design. Netlist 630 may be synthesized using an iterative process in which netlist 630 is resynthesized one or more times depending on design specifications and parameters for the device. As with other design structure types described herein, netlist 630 may be recorded on a machine-readable data storage medium 615 or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 620 may include hardware and software modules for processing a variety of input data structure types including netlist 630. Such data structure types may reside, for example, within library elements 635 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 640, characterization data 650, verification data 660, design rules 670, and test data files 680 which may include input test patterns, output test results, and other testing information. Design process 620 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 620 without deviating from the scope and spirit of the invention. Design process 620 may also include modules for performing standard circuit design processes such as timing analysis, verification, design rule checking, place and route operations, etc.

Design process 620 employs and incorporates logic and physical design tools such as HDL compilers and simulation model build tools to process design structure 610 together with some or all of the depicted supporting data structures along with any additional mechanical design or data (if applicable), to generate a second design structure 690. Design structure 690 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 610, design structure 690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1, 2 and 4. In one embodiment, design structure 690 may comprise a compiled, executable HDL simulation model that functionally simulates the devices shown in FIGS. 1, 2 and 4.

Design structure 690 may also employ a data format used for the exchange of layout data of integrated circuits and/or symbolic data format (e.g., information stored in a GDSII (GDS2), GL1, OASIS, map files, or any other suitable format for storing such design data structures). Design structure 690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1, 2 and 4. Design structure 690 may then proceed to a stage 695 where, for example, design structure 690: proceeds to tape-out, is released to manufacturing, is released to a mask house, is sent to another design house, is sent back to the customer, etc.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A hardware description language (HDL) design structure embodied on a tangible, non transitory machine-readable data storage medium, the HDL design structure comprising elements that when processed in a computer aided design system generates a machine executable representation of a device for implementing dynamic refresh protocols for DRAM based cache, wherein the HDL design structure further comprises:
- a DRAM cache partitioned into a refreshable portion and a non-refreshable portion; and
- a cache controller configured to assign incoming individual cache lines to one of the refreshable portion and the non-refreshable portion of the cache based on a usage history of the cache lines;
- wherein cache lines corresponding to data having a usage history below a defined frequency are assigned by the controller to the refreshable portion of the cache, and cache lines corresponding to data having a usage history at or above the defined frequency are assigned to the non-refreshable portion of the cache.

2. The HDL design structure of claim 1, further comprising:
- a counter associated with each line of the cache, the counter configured to tracking cache line usage; and
- a mechanism to record cache line usage history in a lower level memory hierarchy with respect to the cache.

3. The HDL design structure of claim 2, wherein the counter comprises a 2-bit saturating counter and the cache line usage history is recorded through a single hot/cold indicator bit.

4. The HDL design structure of claim 3, wherein the counter is incremented with each access of the associated cache line.

5. The HDL design structure of claim 3, wherein:
- at the beginning of a refresh cycle, the controller determines the value of the counter for each cache line of the non-refreshable portion of the cache and invalidates any cache line for which the value of the associated counter is equal to zero; and
- the controller resets counter values of the remaining cache lines of the cache to zero.

6. The HDL design structure of claim 3, wherein:
- for a line replacement operation of the cache, the controller determines whether the line to be replaced is located in the refreshable or the non-refreshable portion of the cache and, in the event the line is located in the non-refreshable portion of the cache, sets the value of the hot/cold indicator bit to mark the line as cold in the further event that the line is invalid; and
- in the event that the line is located in the non-refreshable portion of the cache and is valid, or in the event that the line is located in the refreshable portion of the cache, the controller sets the value of the hot/cold indicator bit to mark the line as hot in the further event that the value of the associated counter is at least two;
- otherwise the controller sets the value of the hot/cold indicator bit to mark the line as cold.

7. The HDL design structure of claim 3, wherein:
- for a line fill operation of the cache, the controller determines whether the incoming cache line is designated as hot or cold by the single hot/cold indicator bit in the lower level memory hierarchy;
- the controller places the cache line in the refreshable portion of the cache in the event that the indicator bit for the cache line corresponds to the cold value;
- the controller places the cache line in the non-refreshable portion of the cache in the event that the indicator bit for the cache line corresponds to the hot value; and
- the controller resets the counter for the cache line to zero.

8. The HDL design structure of claim 1, wherein the design structure comprises a netlist.

9. The HDL design structure of claim 1, wherein the design structure resides on storage medium as a data format used for the exchange of layout data of integrated circuits.

10. The HDL design structure of claim 1, wherein the design structure resides in a programmable gate array.

* * * * *